United States Patent
Park et al.

(10) Patent No.: US 6,883,603 B2
(45) Date of Patent: Apr. 26, 2005

(54) METHOD FOR CONTROLLING OPERATION OF REFRIGERATOR WITH TWO EVAPORATORS

(75) Inventors: Jin Koo Park, Kyonggi-do (KR); Yang Kyu Kim, Seoul (KR); Se Young Kim, Seoul (KR); Yin Young Hwang, Kyonggi-do (KR); Joon Hyung Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/120,560

(22) Filed: Apr. 12, 2002

(65) Prior Publication Data

US 2004/0011067 A1 Jan. 22, 2004

(30) Foreign Application Priority Data

| May 8, 2001 | (KR) | P2001-24874 |
| May 8, 2001 | (KR) | P2001-24875 |
| May 8, 2001 | (KR) | P2001-24932 |
| May 10, 2001 | (KR) | P2001-25494 |
| May 11, 2001 | (KR) | P2001-25792 |

(51) Int. Cl.$^7$ ................................. F24F 3/00
(52) U.S. Cl. .................. 165/206; 62/199; 62/229; 165/254
(58) Field of Search ............... 165/206, 259; 62/82, 199, 228.1, 229, 233; 426/131

(56) References Cited

U.S. PATENT DOCUMENTS

| 5,424,210 A | * | 6/1995 | Bae et al. ............ 62/223 |
| 5,477,915 A | * | 12/1995 | Park ................ 165/206 |
| 5,931,004 A | * | 8/1999 | Yoo et al. ............ 62/82 |
| 5,947,197 A | * | 9/1999 | Lee et al. ............ 165/206 |
| 6,006,533 A | * | 12/1999 | Seol ................ 62/228.1 |
| 6,190,712 B1 | * | 2/2001 | Nam ................ 426/231 |
| 6,453,692 B1 | * | 9/2002 | Kim et al. ............ 62/229 |
| 6,526,769 B1 | * | 3/2003 | Kim ................ 62/199 |

* cited by examiner

*Primary Examiner*—Ljiljana Ciric
(74) *Attorney, Agent, or Firm*—Fleshner & Kim, LLP

(57) ABSTRACT

A method for controlling operation of a refrigerator having two evaporators is provided which allows food to be effectively stored in refrigerating and freezing chambers of the refrigerator. A Refrigerating-Freezing (RF) cycle and/or a Freezing (F) cycle of the refrigerator and compressor operation are controlled based on temperatures of various chambers within the refrigerator. This may be further enhanced by also controlling operation of the evaporators and their respective evaporator fans to further optimize cooling output and efficiency. In this manner, the various refrigerating and freezing chambers of the refrigerator can be maintained at an appropriate temperature, power consumption is minimized, and load on the compressor can be adequately managed so as to provide for effective food storage.

23 Claims, 11 Drawing Sheets

| freezing chamber | refrigerating chamber | compressor |
|---|---|---|
| > | > | ON (operation start) |
|   | < | ON (operation start) |
| < | > | ON (continuous operation) |
|   | < | OFF (operation stop) |

\> : When temperatures of respective chambers exceed upper limits of preset temperature ranges < : When temperatures of respective chambers are within preset temperature ranges FIG.2
Related art

| freezing chamber | refrigerating chamber | compressor |
|---|---|---|
| > | > | ON (operation start) |
| > | < | ON (operation start) |
| < | > | OFF (operation stop) |
| < | < | OFF (operation stop) |

> : When temperatures of respective chambers exceed upper limits of preset temperature ranges < : When temperatures of respective chambers are within preset temperature ranges

FIG. 4

| freezing chamber | refrigerating chamber | compressor |
|---|---|---|
| > | > | ON (operation start) |
| > | < | ON (operation start) |
| < | > | ON (continuous operation) |
| < | < | OFF (operation stop) |

> : When temperatures of respective chambers exceed upper limits of preset temperature ranges < : When temperatures of respective chambers are within preset temperature ranges

FIG. 5A

| freezing chamber | refrigerating chamber | compressor |
|---|---|---|
| > | > | ON (operation start) |
| > | < | ON (operation start) |
| < | > | ON (operation start) |
| < | < | OFF (operation stop) |

> : When temperatures of respective chambers exceed upper limits of preset temperature ranges < : When temperatures of respective chambers are within preset temperature ranges

FIG. 5B

| freezing chamber | refrigerating chamber | | compressor |
|---|---|---|---|
| | upper part (designated) | lower part | |
| > | > | > | ON (operation start) |
| | | < | |
| | < | > | |
| | | < | |
| < | > | > | |
| | | < | |
| | | > | ON (continuous operation) |
| | < | < | OFF (operation stop) |

\> : When temperatures of respective chambers exceed upper limits of preset temperature ranges < : When temperatures of respective chambers are within preset temperature ranges

FIG.5C

| freezing chamber | refrigerating chamber | | compressor |
|---|---|---|---|
| | upper part | lower part (designated) | |
| > | > | > | ON (operation start) |
| | | < | |
| | < | > | |
| | | < | |
| < | > | > | ON (continuous operation) |
| | | < | |
| | < | > | ON (operation start) |
| | | < | OFF (operation stop) |

> : When temperatures of respective chambers exceed upper limits of preset temperature ranges < : When temperatures of respective chambers are within preset temperature ranges

FIG.8

| upper refrigerating chamber | lower refrigerating chamber | freezing chamber | compressor | upper refrigerating chamber fermenting heater | lower refrigerating chamber fermenting heater |
|---|---|---|---|---|---|
| > | > | > | ON | OFF | OFF |
| > | > | < | ON | OFF | OFF |
| > | < | > | ON | OFF | ON |
| > | < | < | ON | OFF | ON |
| < | > | > | ON | ON | OFF |
| < | > | < | ON | ON | OFF |
| < | < | > | ON | ON | ON |
| < | < | < | OFF | ON | ON |

\> : When temperatures of respective chambers are higher than preset fermenting temperatures
< : When temperatures of respective chambers are lower than preset fermenting temperatures

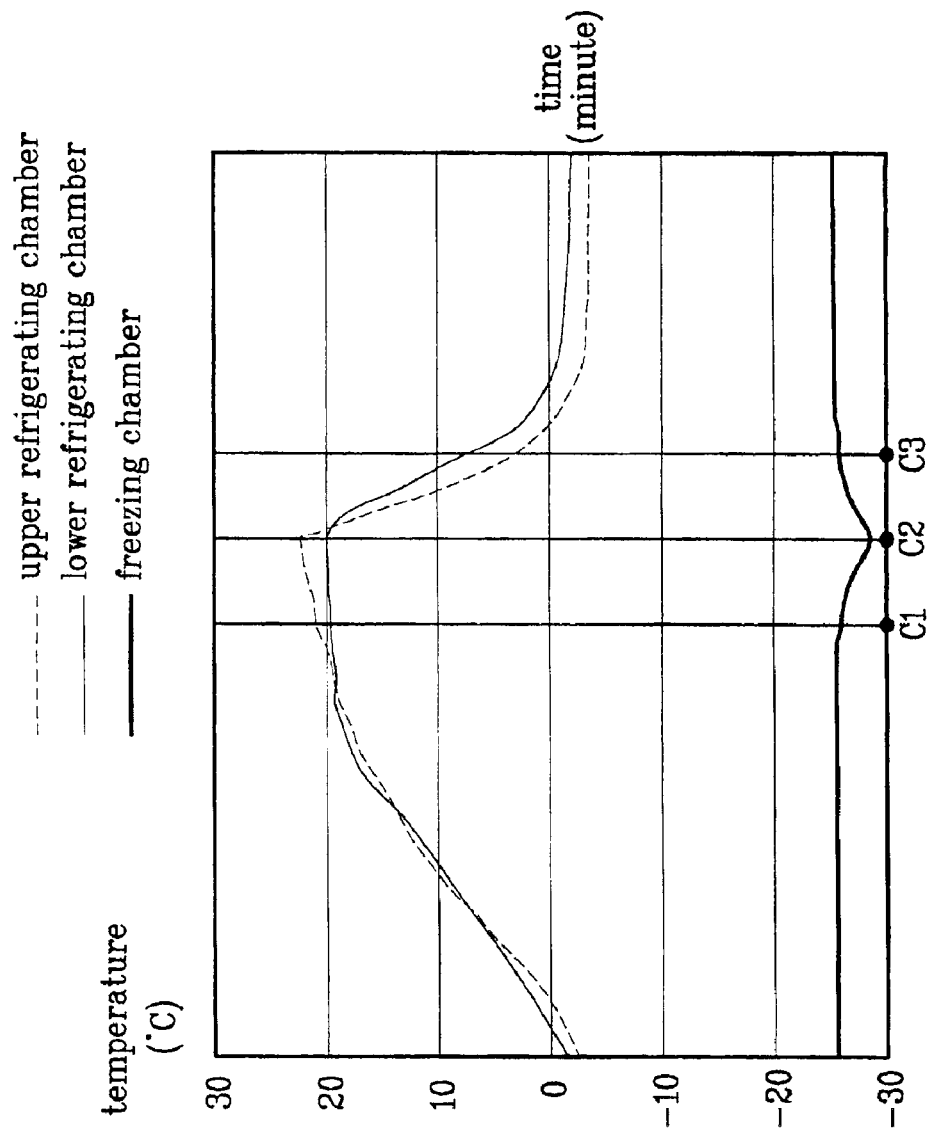

METHOD FOR CONTROLLING OPERATION OF REFRIGERATOR WITH TWO EVAPORATORS

This application claims the benefit of the Korean Application No. P2001-24932 filed on May 8, 2001, No. P2001-24875 filed on May 8, 2001, No.P2001-24874 filed on May 8, 2001, No. P2001-25494 filed on May 10, 2001, and No. P2001-25792 filed on May 11, 2001, which is hereby incorporated by reference.

BACKGROUND OF THE INVENTION

1. Field of the Invention

The present invention relates to a refrigerator, and more particularly, to a method for controlling an operation of a refrigerator with two evaporators.

2. Discussion of the Related Art

Generally, a refrigerator is an appliance used for fresh storage of food for a prolonged time period, and a recent trend has been a development of a refrigerator for effective storage of Kimchi, a Korean specialty.

Referring to FIG. 1A, the refrigerator is provided with a body 10, a freezing chamber 20 for frozen storage of food, a refrigerating chamber 30 for cold storage of food, and a refrigerating cycle for cooling the freezing chamber and the refrigerating chamber. The unexplained reference symbols 40 and 50 are a fermenting heater operative in a fermenting mode, and a damper, respectively.

Referring to FIG. 1B, the refrigerating cycle is provided with a compressor 1 for compressing refrigerant, a condenser 2 for isobaric condensing of the compressed refrigerant, a capillary tube 3 for adiabatic expansion of the condensed refrigerant, evaporators for the refrigerating chamber and for the freezing chamber 4 and 5, respectively, provided at the refrigerating chamber 30 and the freezing chamber 20, respectively for isobaric evaporation of the expanded refrigerant.

The refrigerating cycle is also provided with a three-way valve 6 at a branched point of a flow passage for selective introduction of the refrigerant condensed at the condenser 2 into the evaporators for the refrigerating chamber 4 or the freezing chamber 5 along the branched flow passage, a condenser fan 2a at the condenser 2 for cooling the condenser or the compressor 1, a refrigerating chamber evaporator fan 4a at the refrigerating chamber evaporator 4 for accelerating heat exchange by forcible circulation of air heat-exchanged at the refrigerating chamber evaporator 4, and a freezing chamber evaporator fan 5a at the freezing chamber evaporator 5 for accelerating heat exchange by forcible circulation of air heat-exchanged at the freezing chamber evaporator 5.

Hereinafter, referring to FIG. 1B, the operation of the refrigerator having the refrigerating cycle will be explained.

First, in Refrigerating-Freezing (RF) cycle operation, in which both the refrigerating chamber evaporator 4 and the freezing chamber evaporator 5 are operative, the three-way valve 6 is opened to introduce the refrigerant into the refrigerating chamber evaporator 4, and the gaseous refrigerant compressed at the compressor 1 undergoes a phase conversion into a liquid refrigerant as it passes through the condenser 2, a pressure drop as the refrigerant passes through the capillary tube 3, a phase conversion into gaseous refrigerant as it passes through the refrigerating chamber evaporator 4 and the freezing chamber evaporator 5 sequentially, conducting a heat exchange with air in the refrigerating chamber 30 and the freezing chamber 20, respectively, and is then introduced into the compressor 1.

Second, in Freezing (F) cycle operation in which only the freezing chamber evaporator 5 is operative, the three-way valve 6 is opened to introduce the refrigerant into the freezing chamber evaporator 5, and the gaseous refrigerant compressed in the compressor 1 is involved in a phase conversion into liquid refrigerant as it passes through the condenser, a pressure drops as it passes through the capillary tube 3, and a phase conversion into gaseous refrigerant as it passes through the freezing chamber evaporator 5, conducting a heat exchange with air in the freezing chamber 20, and introduced into the compressor 1.

In the meantime, referring to FIG. 2, in a related art refrigerator, a Freezing (F) control is employed in which the compressor 1 is turned on/off according to a temperature of the freezing chamber 20. That is, if the freezing chamber 20 temperature exceeds an upper limit of a preset temperature range, the compressor 1 is put into operation, to start the RF cycle operation or the F cycle operation, and if the freezing chamber temperature is within the preset temperature range, the compressor 1 is stopped, to stop the RF cycle operation or the F cycle operation.

However, the foregoing related art method for controlling operation of a refrigerator has the following problems.

First, the stop of the compressor 1 under the F control method has the following problem. If the compressor 1 is stopped in the middle of the F cycle operation because the freezing chamber 20 temperature is within the preset temperature range in accordance with the F control method as discussed, but the refrigerating chamber 30 temperature exceeds an upper limit of the preset temperature range due to internal and external loads during a time period from when the time the RF cycle operation is stopped to a time the compressor 1 comes into operation again, there is a problem with the cold storage of food.

That is, if the RF cycle operation is stopped as the refrigerating chamber 30 temperature is within the preset temperature range, the compressor 1 is stopped, and the F cycle operation is stopped too as the freezing chamber 20 temperature is within the preset temperature range. In this instance, if an external air temperature is high above a designed value due to abnormal high temperature due to weather, there is an excessive heat exchange between external air and internal air of the freezing chamber 20 and the refrigerating chamber 30, causing a temperature rise of the refrigerating chamber 30 from a point in time when the RF cycle operation is stopped. This increase in temperature occurs at a rate higher than in the freezing chamber 20, as a surface area of the refrigerating chamber is larger than that of the freezing chamber 20, and an insulation thickness of the refrigerating chamber is thinner than that of the freezing chamber 20.

Eventually, because the refrigerating chamber 30 is in a state in which the temperature thereof exceeds the preset temperature range from a time point in time when the RF cycle operation is stopped to a point in time point when the RF cycle operation is started again as the compressor 1 is put into operation again, there is a problem with the cold storage of food.

Also, since the compressor is stopped if the freezing chamber 20 temperature is within the preset temperature range, when hot food is put in the refrigerating chamber 30 after the F cycle operation is stopped, the refrigerating chamber 30 temperature exceeds the upper limit of the preset temperature range.

According to this, since the refrigerating chamber 30 temperature exceeds the upper limit of the preset temperature range from a moment when hot food is put in the refrigerating chamber 30 to a moment when the RF cycle operation starts again by putting the compressor 1 into operation again, there is a problem in the cold storage of food.

Second, if the compressor 1 starts under the F control method, the following problem is caused.

If operation of the compressor 1 is determined only by the freezing chamber 20 temperature, that is, if the compressor 1 is put into operation only when the freezing chamber 20 temperature exceeds the upper limit of the preset temperature range, there is a problem with cold storage of food when the refrigerating chamber 30 temperature exceeds the upper limit of the preset temperature range due to said the foregoing various factors (the external air temperature, or hot food temperature) or frequent opening/closing of the refrigerating chamber 30.

SUMMARY OF THE INVENTION

Accordingly, the present invention is directed to a method for controlling operation of a refrigerator with two evaporators that substantially obviates one or more problems due to limitations and disadvantages of the related art.

An object of the present invention is to provide a method for controlling operation of a refrigerator with two evaporators, in which food can be effectively stored in a cold or frozen even in the presence of internal and external loads which influence a refrigerating chamber.

Another object of the present invention is to provide a method for controlling operation of a refrigerator with two evaporators, which can ferment food effectively that requires fermentation, and prevent a temperature rise of a freezing chamber when a fermenting mode is finished.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling operation of a refrigerator with two evaporators includes the steps of (a) starting step for starting the compressor; (b) continuous operation step for carrying out the RF cycle operation or the F cycle operation depending on a temperature of the freezing chamber or the refrigerating chamber after the compressor is started; and (c) operation stopping step for stopping operation of the compressor if the freezing chamber temperature and the refrigerating chamber temperature are within respective preset temperature ranges.

At this time, the step (a) includes a step for starting the compressor when the freezing chamber temperature exceeds an upper limit of a preset temperature range as one embodiment, and includes a step for starting the compressor when either the freezing chamber temperature or the refrigerating chamber temperature exceeds an upper limit of a preset temperature range as another embodiment.

The step (b), as one embodiment, includes a step for selectively operating a step including a first step for making the RF cycle operation if the freezing chamber temperature and the refrigerating chamber temperature exceed upper limits of the respective preset temperature ranges, a second step for making the F cycle operation if the refrigerating chamber temperature is within a preset temperature range and the freezing chamber temperature exceeds an upper limit of a preset temperature range, and a third step for making the F cycle operation if the freezing chamber temperature is within a preset temperature range and the refrigerating chamber temperature exceeds an upper limit of a preset temperature range.

Also, the step (b), as another embodiment, includes a RF cycle operation step for making the RF cycle operation if the freezing chamber temperature and the refrigerating chamber temperature exceed upper limits of the respective preset temperature ranges, an F cycle operation step for making the F cycle operation if the refrigerating chamber temperature is within a preset temperature range and the freezing chamber temperature exceeds an upper limit of a preset temperature range, and a continuous F cycle operation step for making the F cycle operation continuously even if the freezing chamber temperature is within a preset temperature range and the refrigerating chamber temperature exceeds an upper limit of a preset temperature range.

In the meantime, it is preferable that a method for controlling operation of a refrigerator according to the present invention further includes a multiple stage load responding step for operating the refrigerating chamber evaporator fan only or making the RF cycle operation again under a state the RF cycle operation is stopped by setting a temperature range of the refrigerating chamber in multiple stages for multiple stage control of the refrigerating chamber temperature varied under influences from internal and external loads during the step (b) is carried out.

Herein, it is preferable that the step (d) further includes a first stage load responding step for operating the refrigerating chamber evaporator fan at the refrigerating chamber evaporator when the refrigerating chamber temperature exceeds the upper limit of the first preset temperature range due to the internal and external loads after the RF cycle operation is stopped; and a second stage load responding step for operating the RF cycle after the RF cycle operation is stopped so as to introduce refrigerant to the refrigerating chamber evaporator in case that the refrigerating chamber temperature exceeds the upper limit of the second preset temperature range higher than that of the first preset temperature range.

In another meantime, it is preferable that a method for controlling operation of a refrigerator according to the present invention further includes the step (e) for stopping the compressor when the freezing chamber temperature and the refrigerating chamber temperature are lower than respective preset fermenting temperatures and for operating the compressor when at least one chamber temperature is higher than a preset fermenting temperature in a fermenting mode by a fermenting heater provided at the refrigerating chamber during the steps (a), (b), and (c) are repeated as a series of cycles.

Also, it is preferable that a method for controlling operation of a refrigerator further includes a first pre-cooling step for making the F cycle operation for a preset time period before the fermenting mode operation is stopped to cool down the freezing chamber in advance; and a second pre-cooling step for making the RF cycle operation to cool down the refrigerating chamber and the freezing chamber on the same time when the fermenting mode operation is stopped.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a method for controlling operation of a related art refrigerator, showing conditions in which a compressor is turned on/off depending on a freezing chamber temperature;

FIG. 4 illustrates conditions a compressor is turned on/off depending on temperatures of a freezing chamber and a refrigerating chamber according to an embodiment of the present invention;

FIG. 5A illustrates conditions a compressor is turned on/off depending on temperatures of a freezing chamber and a refrigerating chamber according to another embodiment of the present invention;

FIG. 5B illustrates detailed conditions of FIG. 5A showing turning on/off of the compressor depending on temperatures of the freezing chamber and an upper refrigerating chamber, in case that the refrigerator has two refrigerating chambers;

FIG. 5C illustrates detailed conditions of FIG. 5A showing turning on/off of the compressor depending on temperatures of the freezing chamber and a lower refrigerating chamber, in case that the refrigerator has two refrigerating chambers;

FIG. 8 illustrates turning on/off conditions of the compressor in a fermenting mode according to the present invention; and FIG. 9 illustrates a graph showing a temperature variation of a freezing chamber by time at the time when the fermenting mode ends according to the present invention.

DETAILED DESCRIPTION OF THE INVENTION

Figure 1A:
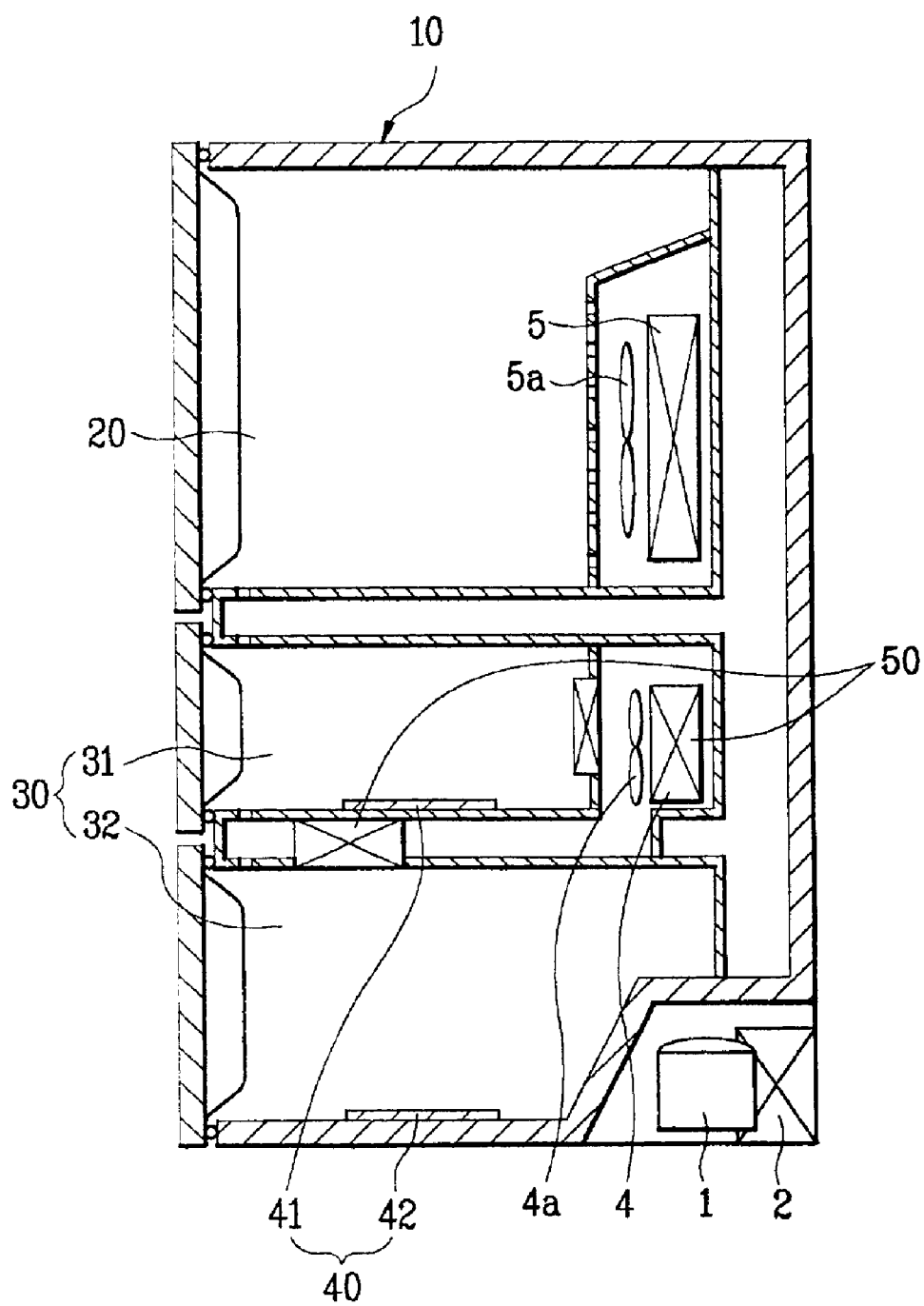
FIG. 1A illustrates a schematic sectional view showing a related art refrigerator.
Figure 1B:
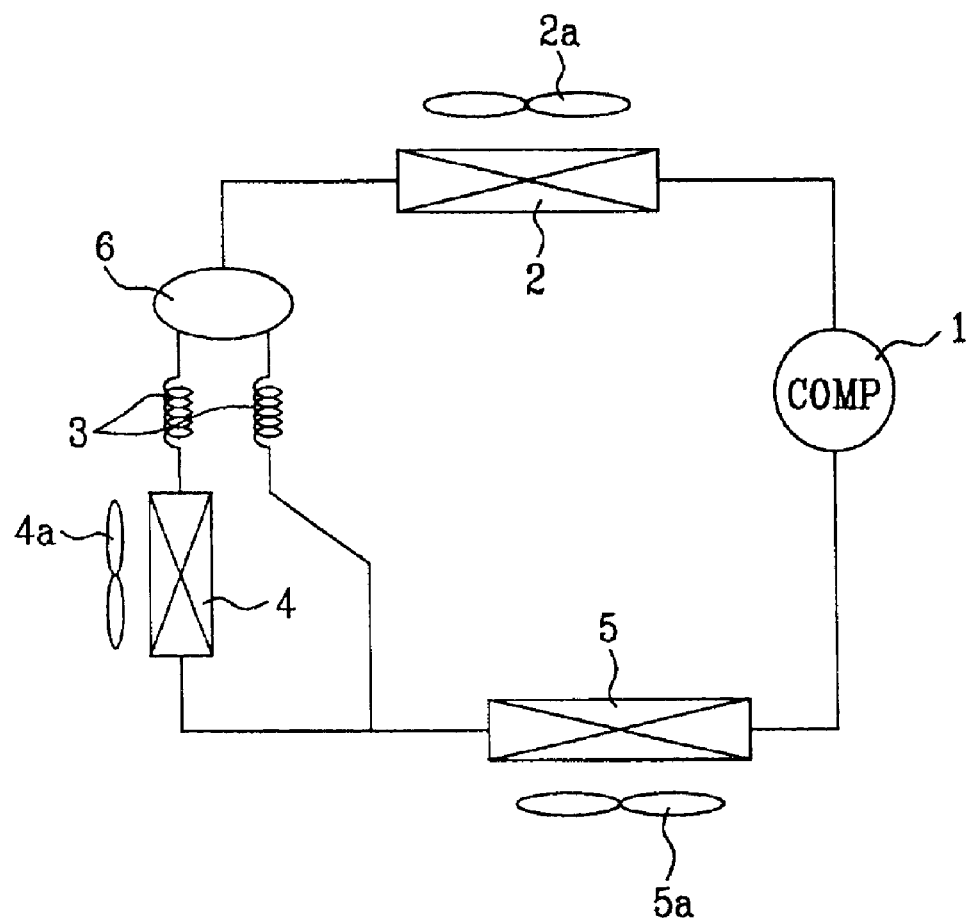
FIG. 1B illustrates a block diagram showing a refrigerating cycle of a related art refrigerator.

Reference will now be made in detail to the preferred embodiments of the present invention, examples of which are illustrated in the accompanying drawings. Wherever possible, the same reference numbers will be used throughout the drawings to refer to the same or like parts.

Since a Refrigerating Freezing (RF) cycle of a refrigerator is described in the related art, the explanation will be omitted, and the same reference symbols will be used for the parts identical to the related art.

Referring to FIGS. 3, and 4 to 6, a method for controlling operation of a refrigerator in accordance with a preferred embodiment of the present invention having an RF cycle operation in which a refrigerating chamber evaporator 4 and a freezing chamber evaporator 5 are put into operation in succession upon starting the compressor 1 and an F cycle operation in which only the freezing chamber evaporator 5 is put into operation upon starting the compressor 1, includes the steps of starting a compressor (S10), continuous operation of the compressor 1 for carrying out the RF cycle operation or the F cycle operation depending on temperatures of the freezing chamber 20 and the refrigerating chamber 30 after the compressor is started (S20), and stopping operation of the compressor 1 in case that the freezing chamber 20 temperature and the refrigerating chamber 30 temperature are within preset temperature ranges, respectively (S30).

Figure 3:
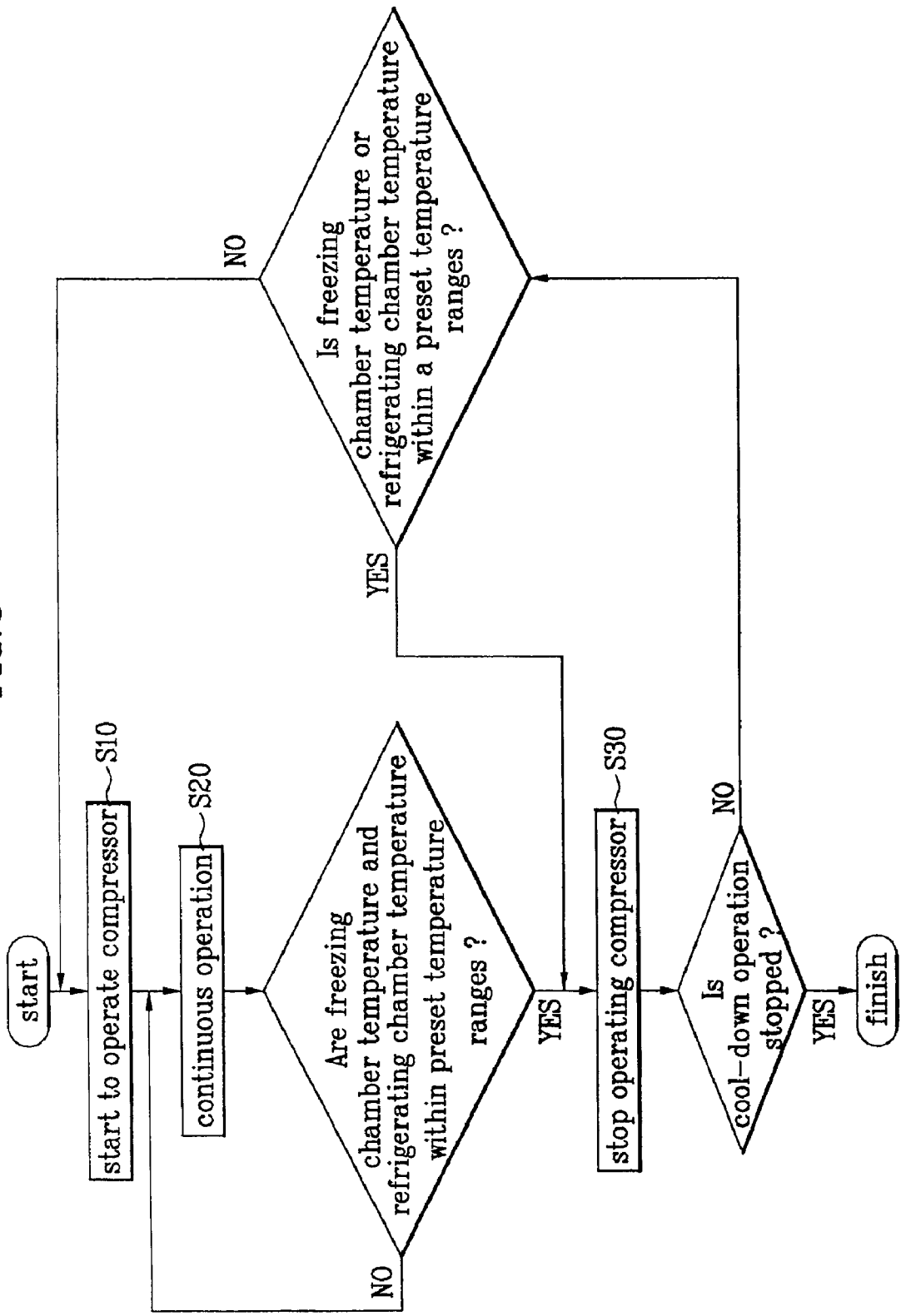
FIG. 3 illustrates a flow chart showing the steps of a method for controlling operation of a refrigerator in accordance with a preferred embodiment of the present invention.

Various embodiments of the step of starting a compressor (S10) in the steps of a method for controlling operation of a refrigerator as shown in FIG. 3 and in accordance with the present invention will be explained. These will be discussed with respect to FIGS. 4 and 5A–5C.

First, the step of starting a compressor (S10) may be a step for starting a compressor 1 in case that a temperature of the freezing chamber 20 exceeds an upper limit of the preset temperature range, as shown in FIG. 4. Starting a compressor (S10) may also be a step for starting a compressor 1 when a temperature of either the freezing chamber 20 or the refrigerating chamber 30 exceeds an upper limit of a respective preset temperature range, as shown in FIG. 5A.

Herein, the step of starting a compressor (S10) as illustrated in FIG. 4 has an advantage of reducing a number of turning on times, since operation of the compressor 1 depends only on a freezing chamber 20 temperature.

Also, the step of starting a compressor (S10) as illustrated in FIG. 5A has an advantage of effective frozen/cold storage of food because the starting of the compressor 1 is dependent both on the freezing chamber 20 temperature and the refrigerating chamber 30 temperature. So, even if the freezing chamber 20 is within the preset temperature range, the compressor 1 remains operative, if the refrigerating chamber 30 temperature exceeds the upper limit of its preset temperature range. Additionally, even if the refrigerating chamber 30 temperature is within its preset temperature range, the compressor 1 remains operative if the freezing chamber 20 temperature exceeds the upper limit of its preset temperature range.

Along with this, there may be other embodiments of the step of starting a compressor (S10) shown in FIG. 3 depending on a number of the refrigerating chambers 30. These will be discussed with respect to FIGS. 5B and 5C.

That is, if there are plural refrigerating chambers 30, the compressor 1 may be put into operation, if a temperature of at least one designated refrigerating chamber 30 or the freezing chamber 20 exceeds its upper limit of the respective preset temperature range. In this instance, it is preferable that there be at least one designated refrigerating chamber which has a greater temperature variation than the other refrigerating chambers 30 in view of characteristics of food storage for different types of food.

In detail, the at least one designated refrigerating chamber 30 may be a refrigerating chamber 30 which stores food requiring fermenting such as Kimchi. The reason is because the temperature variation can be great, since a fermenting heater 40 is operated in the refrigerating chamber 30 when it is in the fermenting mode. Or, the at least one designated refrigerating chamber 30 may one that requires frequent opening of the door.

In more detail, in a case in which the refrigerating chamber 30 is divided into an upper part 31 and a lower part 32, the step for starting a compressor (S10) shown in FIG. 3 may be conducted in two different manners, which will be discussed with respect to FIGS. 5B and 5C.

First, referring to FIG. 5B, the step or starting a compressor (S10) may be a step for starting the compressor 1 when a temperature of either the upper refrigerating chamber 31 or the freezing chamber 20 exceeds an upper limit of the preset temperature range if the upper refrigerating chamber 31 is the designated one. Of course, in this instance, the upper refrigerating chamber 31 has the greater temperature variation.

Second, referring to FIG. 5C, the step of starting a compressor (S10) may be a step for starting the compressor 1 when a temperature of either the lower refrigerating chamber 32 or the freezing chamber 20 exceeds the upper limit of its preset temperature range if the lower refrigerating chamber 32 is the designated one. Of course, in this instance, that the lower refrigerating chamber 32 has greater temperature variation.

Thus, when there are plural refrigerating chambers 30, since operation of the compressor 1 is dependent on the temperatures of the freezing chamber 20 and at least one designated refrigerating chamber (a refrigerating chamber having a greater temperature variation), starting the compressor 1 is dependent not only on the freezing chamber 20 temperature, but also on the refrigerating chamber 30 temperature. Thus the step of starting a compressor (S10), when conducted in the manner described, has an advantage of permitting perfect frozen/cold storage of food.

Hereinafter, various embodiments of the step for continuous operation (S20) in the method for controlling operation of a refrigerator of the present invention shown in FIG. 3 will be explained.

First, as one embodiment, the step for continuous operation (S20) may includes a first step for conducting an RF cycle operation if the freezing chamber 20 temperature and the refrigerating chamber 30 temperature exceed the upper limits of each preset temperature range, a second step for conducting an F cycle operation if the refrigerating chamber 30 temperature is within the preset temperature range and the freezing chamber 20 temperature exceeds an upper limit of the preset temperature range, and a third step for making an RF cycle operation if the freezing chamber 20 temperature is within the preset temperature range and the refrigerating chamber temperature exceeds the upper limit of its preset temperature range.

Along with this, it is preferable that the third step further includes a step for suppressing heat exchange of the freezing chamber evaporator by stopping a freezing chamber evaporator fan 5a in order to maintain the freezing chamber 20 temperature within the preset temperature range.

Herein, the one embodiment of the step for continuous operation (S20) will be explained in more detail.

Once the compressor 1 is put into operation, it is determined whether the RF cycle operation or an F cycle operation is conducted based on the freezing chamber 20 temperature and the refrigerating chamber 30 temperature. If the freezing chamber 20 temperature and the refrigerating chamber 30 temperature exceed the upper limits of each preset temperature range, the RF cycle operation is made so as to introduce refrigerant into the refrigerating chamber evaporator 4 and the freezing chamber evaporator 5.

If only the freezing chamber 20 temperature exceeds the upper limit of the preset temperature range in the middle of an RF cycle operation, an F cycle operation is initiated so as to introduce the refrigerant into the freezing chamber evaporator 5.

Though it is required to drop the refrigerator chamber 30 temperature when the refrigerating chamber 30 temperature exceeds the upper limit of the preset temperature range in the middle of the F cycle operation, the RF cycle operation allows refrigerant to flows through both the refrigerating chamber evaporator 4 and the freezing chamber evaporator 5 in order to maintain the refrigerating chamber 30 temperature within the preset temperature range. In contrast, the related art refrigerating cycle system permits a refrigerant flow to only the refrigerating chamber evaporator 4 and the freezing chamber evaporator 5 in succession.

In this instance, since no acceleration of heat exchange between air in the freezing chamber 20 and refrigerant of the freezing chamber evaporator 5 is necessarily required, as the freezing chamber 20 temperature is maintained within its preset temperature range, operation of the freezing chamber evaporator fan 5a is stopped. On the other hand, since the refrigerating chamber 30 temperature exceeds the upper limit of the preset temperature range, the refrigerating chamber evaporator fan 4a is operated so as to accelerate heat exchange of the refrigerating chamber evaporator 4.

According to this, since the freezing chamber 20 temperature and the refrigerating chamber 30 temperature fall within their respective preset temperature ranges, effective cold/frozen food storage is made possible.

Figure 6:
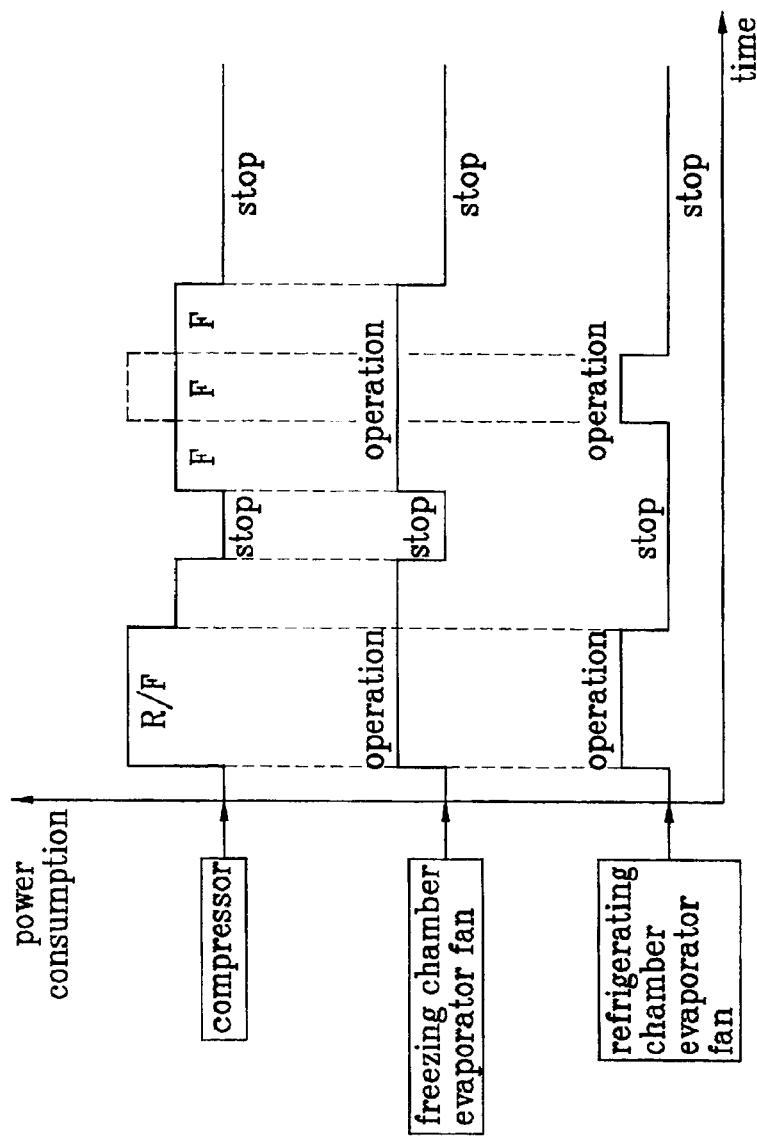
FIG. 6 illustrates a state diagram showing a cycle in the step for continuous operation in a method for controlling operation of a refrigerator according to the present invention.

Second, as shown in FIG. 6, the step for continuous operation (S20) selectively includes an RF operation step for conducting the RF cycle operation if the freezing chamber 20 temperature and the refrigerating chamber 30 temperature exceed upper limits of respective preset temperature ranges, an F cycle operation step for conducting the F cycle operation if the refrigerating chamber 30 temperature is within the preset temperature range and the freezing chamber 20 temperature exceeds the upper limit of the preset temperature range, and a continuous F cycle operation step for continuous operation of the F cycle even if the freezing chamber 20 temperature is within the preset temperature range and the refrigerating chamber 30 temperature exceeds the upper limit of the preset temperature range.

In addition to this, it is preferable that the step for continuous operation (S20) further includes a step for operating the refrigerating chamber evaporator fan 4a at the refrigerating chamber evaporator 4, together with the F cycle operation.

Herein, referring to FIG. 6, another embodiment of the step for continuous operation (S20) will be explained in more detail.

Generally, when compressor 1 is initiated, the freezing chamber 20 temperature and the refrigerating chamber 30 temperature exceed the upper limits of respective preset temperature ranges. Accordingly, the RF cycle operation is conducted so as to introduce refrigerant into the refrigerating chamber evaporator 4 and the freezing chamber evaporator 5.

If at only the freezing chamber 20 temperature exceeds the upper limit of the preset temperature range in the middle of the RF cycle operation, the F cycle operation is conducted so as to introduce refrigerant only into the freezing chamber evaporator 5.

Thereafter, if the refrigerating chamber 30 temperature exceeds the upper limit of its preset temperature range in the middle of the F cycle operation, the F cycle operation is not switched over to the RF cycle operation, which consumes much of the compressor 1 power, but is continued. In this instance, since the refrigerating chamber 30 temperature must be dropped, the refrigerating chamber evaporator fan 4a is operated together with the F cycle operation.

When the compressor 1 is put into operation once again after the compressor 1 is stopped, the RF cycle operation or the F cycle operation is carried out, and if the refrigerating chamber 30 temperature exceeds the upper limit of the preset temperature range in the middle of the F cycle operation, the step for continuous operation of the F cycle is carried out.

Accordingly, since, not the step for continuous operation of the RF cycle, but the step for operation of the RF cycle, is carried out in case that the refrigerating chamber 30 temperature does fall within its preset temperature range, power consumption of the compressor 1 can be reduced. Moreover, since the freezing chamber 20 temperature and the refrigerating chamber 30 temperature meet respective preset temperature ranges, effective cold/frozen food storage is made possible.

In the meantime, in case that there are plural refrigerating chambers 30, as one embodiment of the step of stopping operation of the compressor (S30) in the method for controlling operation of a refrigerator showm in FIG. 3, it is preferable that the compressor 1 is stopped when all the refrigerating chamber 30 temperatures and the freezing chamber 20 are within respective preset temperature ranges.

Consequently, since the compressor 1 never stops in a state even one of the refrigerating chamber temperature and the freezing chamber temperature exceeds respective upper limits of the preset temperature ranges, perfect cold/frozen storage of food is made possible.

Figure 7:
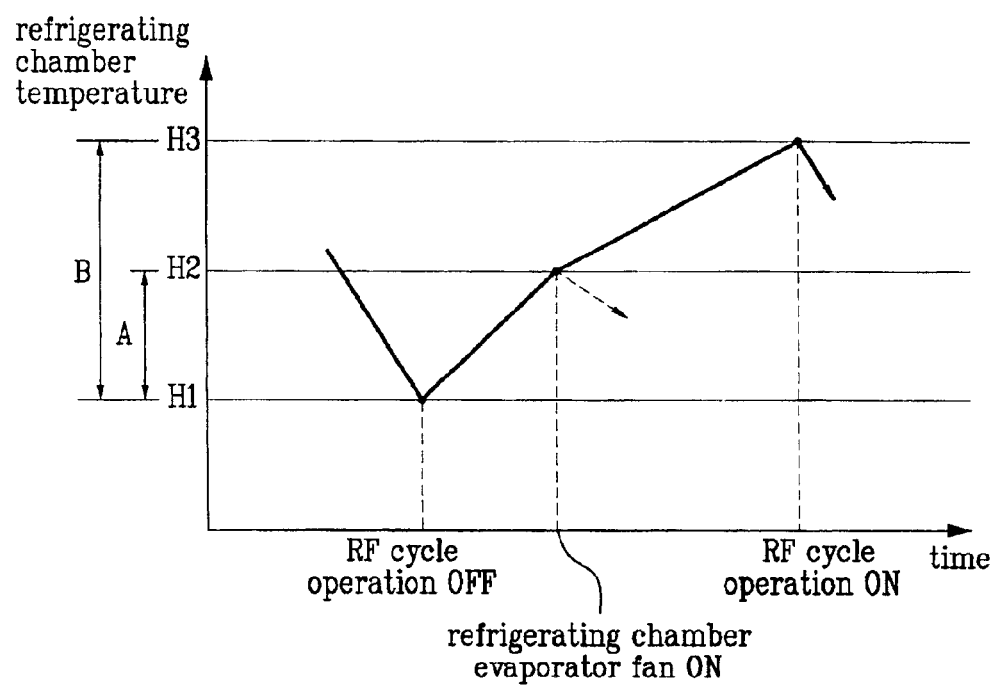
FIG. 7 illustrates a graph showing a temperature variation of a refrigerating chamber by time depending on internal and external loads of the present invention.

In the meantime, referring to FIG. 7, in order to make a multiple stage control of the refrigerating chamber 30 temperature which varies with external/internal loads when the continuous operation step (20) is carried out, it is preferable that the method for controlling operation of a refrigerator according to the present invention further includes a multiple stage load responding step, in which the refrigerating chamber 30 preset temperature range is set in multiple stages for operating the refrigerating chamber evaporator fan 4a or the RF cycle operation is conducted again under when the operation of the RF cycle is stopped by making multiple stage temperature range setting for the refrigerating chamber 30.

It is preferable that the multiple stage load responding step includes a first stage load responding step for operating the refrigerating chamber evaporator fan 4a if the refrigerating chamber 30 temperature exceeds the upper limit (H2) of a first preset temperature range (A) due to internal/external loads applied after the RF cycle operation is stopped, and a second stage load responding step for making the RF cycle operation to introduce the refrigerant into the refrigerating chamber evaporator 4 if the refrigerating chamber 30 temperature exceeds the upper limit (H3) of a second preset temperature range (B) higher than that of the first preset temperature range (A) due to the internal/external loads after the RF cycle operation is stopped.

Herein, it is preferable that the first stage load responding step includes a step for operating the refrigerating chamber evaporator fan 4a from a time the refrigerating chamber 30 temperature exceeds the upper limit (H2) of the first preset temperature range (A) to a time the refrigerating chamber 30 temperature reaches to the upper limit (H3) of the second preset temperature range (B), and a step for stopping the refrigerating chamber evaporator fan 4a when the refrigerating chamber 30 temperature falls within the first preset temperature range (A).

Also, it is preferable that the second stage load responding step includes a step for conducting the RF cycle operation and operating the refrigerating chamber evaporator 4a when the refrigerating chamber 30 temperature exceeds the upper limit (H3) of the second preset temperature range (B), and a step for stopping both the RF cycle operation and the refrigerating chamber evaporator fan 4a when the refrigerating chamber 30 temperature falls within a first preset temperature range (A).

It is preferable that the upper limit (H3) of the second preset temperature range (B) is higher than the upper limit (H2) of the first preset temperature range (A), and the lower limit (H1) of the second preset temperature range (B) is equal to the lower limit (H1) of the first preset temperature range (A).

Referring to FIG. 7, the multiple stage load responding step will be explained in more detail.

First, in a case that the refrigerating chamber 30 temperature is between the upper limit (H2) of the first preset temperature range (A) and the upper limit (H3) of the second preset temperature range (B) due to the internal/external loads applied after after the RF cycle operation is stopped, the refrigerating chamber evaporator fan 4a is put into operation so as to drop the refrigerating chamber 30 temperature to be within the first preset temperature range (A) or rise up slowly. The reason why only the refrigerating chamber evaporator fan 4a is put into operation, and that the RF cycle operation is not conducted at this point is to reduce a number of turn on/off times of the compressor 1 for making a more effective response to the loads.

Second, when the refrigerating chamber 30 temperature exceeds the upper limit (H3) of the second preset temperature range (B), the RF cycle operation is initiated and the refrigerating chamber evaporator fan 4a is operated to drop the refrigerating chamber 30 temperature down to the first preset temperature range (A). In this instance, not only the refrigerating chamber evaporator fan 4a is operated, but also the RF cycle operation is initiated in order to prove an effective response to the load. More specifically, when the refrigerator chamber 30 temperature exceeds the upper limit (H3) of the second preset temperature range (B), it is beyond a point at which the temperature may be lowered and maintained within the preset temperature range simply through operation of the refrigerating chamber evaporator fan 4a.

Third, if the freezing chamber 20 temperature is within the preset temperature range when the refrigerating chamber 30 temperature reaches to the upper limit (H3) of the second preset temperature range (B) to start the RF cycle operation, it is preferable that operation of the freezing chamber evaporator fan 5a is stopped so as to prevent unnecessary power consumption.

According to this, it is possible to provide an effective response to the internal/external loads applied to the refrigerating chamber 30.

In the meantime, it is preferable that the method for controlling operation of a refrigerator according to the present invention further includes a fermenting control step for stopping the compressor 1 if the freezing chamber 20 temperature and the refrigerating chamber 30 temperature are lower than relevant preset fermenting temperatures, and for operating the compressor 1 if at least one of the temperatures of the chambers is higher than the preset fermenting temperature. This is done when the refrigerator is in a fermenting mode by a fermenting heater 40 provided with the refrigerating chamber 30 while the step for starting a compressor (S10), the step for continuous operation (S20), and the step for stopping operation (S30) are conducted repeatedly to form a series of cycles.

Moreover, there may be various fermenting control steps based on a number of the refrigerating chambers 30.

That is, in a case that there are plural refrigerating chambers 30 in a refrigerator, it is preferable that if the freezing chamber 20 temperature and all the refrigerating chamber 30 temperatures are lower than respective preset fermenting temperatures, the compressor 1 is stopped, and if the temperature of at least one chamber is higher than the preset fermenting temperature, the compressor 1 is operated.

Referring to FIG. 8, the fermenting control step will be explained in more detail. It is assumed that the refrigerating chamber 30 is divided into an upper part 31 and a lower part 32.

First, when both the fermenting heaters 41 and 42 for the upper refrigerating chamber 31 and the lower refrigerating chamber 32, respectively, are turned on to start fermenting operation, if the upper refrigerating chamber 31 temperature is lower than the fermenting temperature of the upper refrigerating chamber 31, the lower refrigerating chamber 32 temperature is lower than the fermenting temperature of the lower refrigerating chamber 32, and the freezing chamber 20 temperature is lower than the preset temperature of the freezing chamber, the compressor 1 is stopped.

Second, when both the fermenting heaters 41 and 42 for the upper refrigerating chamber 31 and the lower refrigerating chamber 32, respectively, are turned on to start fermenting, if a temperature of at least any one of the upper refrigerating chambers 31, the lower refrigerating chamber 32, and the freezing chamber 20 is higher than a relevant preset fermenting temperature, the compressor 1 is put into operation The compressor 1 is put into operation in the above condition is because operation of the compressor 1 is essential for dropping a temperature of the chamber of which the temperature is higher than the preset fermenting temperature through a cooling operation under the F cycle or the RF cycle. More specifically, if the freezing chamber 20 temperature is higher than a preset temperature, the F cycle operation is conducted and if the upper refrigerating chamber 31 temperature or the lower refrigerating chamber 32 temperature is higher than a fermenting temperature, the RF cycle operation is conducted.

According to this, food requiring fermenting, particularly, Kimchi can be fermented at an accurate fermenting temperature.

In the meantime, referring to FIG. 9, the method for, controlling operation of a refrigerator may further include a first pre-cooling step for cooling the freezing chamber 20 in advance by conducting the F cycle operation for a preset time period (C1–C2 period) before the fermenting mode (C2) ends, and a second pre-cooling step for conducting the RF cycle operation and cooling the refrigerating chamber 30 and the freezing chamber 20 at the same time when operation of the fermenting mode is finished (C2). According to this, a situation in which the freezing chamber 20 temperature goes up when the fermenting mode operation is finished can be prevented in advance.

In this instance, the preset time period (C1–C2 period) of the first pre-cooling step is varied with capacities of refrigerators calculated so that the freezing chamber 20 temperature is within the preset temperature range even if refrigerant in the freezing chamber evaporator 5 heat exchanges with air in the freezing chamber 20 under the RF cycle operation as the fermenting mode operation is finished (C).

Along with this, it is preferable that the second pre-cooling step further includes a step for stopping an operation of the freezing chamber evaporator fan 5a for a fixed time period (C2–C3 period) when the fermenting mode operation is finished (C2).

It is preferable that the fixed time period (C2–C3 period) ranges from a time point when operation of the fermenting mode is finished (C2) to a time point when the refrigerating chamber 30 temperature falls within its preset temperature range in which the food can be stored properly (C3). The reason is that, if the freezing chamber evaporator fan 5a is operated when the refrigerating chamber 30 temperature exceeds the upper limit of the preset temperature range, though the freezing chamber 20 temperature rises sharply when refrigerant which has been heat-exchanged with air in the refrigerating chamber 30 is introduced into the freezing chamber evaporator 5, the freezing chamber 20 temperature may still fall within its preset temperature range if the freezing chamber evaporator 5 is operated when the refrigerating chamber 30 temperature falls within its preset temperature range.

Referring to FIG. 9, the first and second pre-cooling steps will be explained in more detail.

When the RF cycle operation is carried out after the fermenting mode (C2) is finished, the refrigerating chamber 30 is in a state the refrigerating chamber 30 temperature exceeds the upper limit of the preset temperature range. Therefore, high temperature refrigerant in the refrigerating chamber evaporator 4 is introduced into the freezing chamber evaporator 5, thereby making the freezing chamber 20 temperature rise. However, in the present invention, since the F cycle operation has already been carried out in the first pre-cooling step, the refrigerating chamber 20 temperature falls within its preset temperature range, and even though the high temperature refrigerant is introduced into the freezing chamber evaporator 5, the freezing chamber 20 temperature may be maintained within its preset range.

In addition to this, since the heat exchange between the air in the freezing chamber 20 and the freezing chamber evaporator 5 slows down, effective frozen storage of food in the freezing chamber 20 is made possible even if the refrigerant heat exchanged with the high temperature air in the refrigerating chamber 30 is introduced into the freezing chamber evaporator 5, because the freezing chamber evaporator fan 5a is stopped from a time when the fermenting mode is finished (C2) to a time when the refrigerating chamber 30 temperature reaches its preset temperature range proper for cold storage of food such as Kimchi (C3). Subsequently, if the refrigerating chamber 30 temperature reaches to the preset temperature range proper for cold storage of food, a time when temperature of refrigerant introduced into the freezing chamber evaporator 5 is dropped (C2), heat exchange between air in the freezing chamber 20 and the freezing chamber evaporator 5 is accelerated by the operation of the freezing chamber evaporator 5a, permitting effective frozen storage of food in the freezing chamber.

As has been explained, the present invention has the following advantages.

First, since the compressor is stopped when temperatures both of the refrigerating chamber and the freezing chamber meet the preset temperature ranges, effective cold/frozen storage of food is made possible.

Second, since the compressor starts when a temperature of either the refrigerating chamber or the freezing chamber does not meets the preset temperature range, effective cold/frozen storage of food is made possible from a moment when the compressor starts.

Third, the multiple stages of the preset temperature range of the refrigerating chamber permit to make an effective response to internal/external loads. The operation of the only refrigerating chamber evaporator within a preset temperature range permits to reduce a number of compressor turn on/off times, thereby reducing power consumption.

Fourth, since a proper temperature for fermenting is maintained by separate control turn on/off of the compressor in the fermenting, food requiring for fermenting can be fermented at fermenting temperatures that can be set differently.

Fifth, since the pre-cooling is carried out before the fermenting mode operation is finished, the temperature rise of the freezing chamber occurred at the time of starting the RF cycle operation is prevented in advance, effective frozen storage of food in the freezing chamber is made possible.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for controlling operation of a refrigerator, in which a refrigerating chamber and a freezing chamber of the refrigerator are cooled by a Refrigerating-Freezing (RF) cycle which operates a refrigerating chamber evaporator and a freezing chamber evaporator through operation of a compressor, or by a Freezing (F) cycle which operates only a freezing chamber evaporator through the operation of the compressor, comprising:

(a) starting the compressor;
   (b) carrying out a continuous operation of the RF cycle or the F cycle depending on a temperature of the freezing chamber or the refrigerating chamber after the compressor is started; and
   (c) stopping operation of the compressor if a freezing chamber temperature and a refrigerating chamber temperature are within respective preset temperature ranges.

2. The method as claimed in claim 1, wherein the step (a) further comprises starting the compressor when the freezing chamber temperature exceeds an upper limit of a preset temperature range.

3. The method as claimed in claim 1, wherein the step (b) comprises:

carrying out the RF cycle operation if the freezing chamber temperature and the refrigerating chamber temperature exceed upper limits of respective preset temperature ranges;
   carrying out the F cycle operation if the refrigerating chamber temperature is within a preset temperature range and the freezing chamber temperature exceeds an upper limit of a preset temperature range; and
   carrying out the RF cycle operation if the freezing chamber temperature is within a preset temperature range and the refrigerating chamber temperature exceeds an upper limit of a preset temperature range.

4. The method as claimed in claim 3, wherein if the freezing chamber temperature is within a preset temperature range and the refrigerating chamber temperature exceeds an upper limit of a preset temperature range, carrying out the RF cycle operation comprising suppressing heat exchange of the freezing chamber evaporator by stopping a freezing chamber evaporator fan.

5. The method as claimed in claim 1, wherein the step (b) comprises:

carrying out the RF cycle operation if the freezing chamber temperature and the refrigerating chamber temperature exceed upper limits of respective preset temperature ranges;
   carrying out the F cycle operation if the refrigerating chamber temperature is within the preset temperature range and the freezing chamber temperature exceeds the upper limit of the preset temperature range; and
   carrying out the F cycle operation continuously if the freezing chamber temperature falls to within the preset temperature range and the refrigerating chamber temperature rises to exceed the upper limit of the preset temperature range.

6. The method as claimed in claim 5, wherein the step of carrying out the continuous F cycle operation step further includes operating the refrigerating chamber evaporator fan provided at the refrigerating chamber evaporator.

7. The method as claimed in claim 1, wherein the step (c) includes a step of stopping operation of the compressor if temperatures of the freezing chamber and one section of the refrigerating chamber are within respective preset temperature ranges if the refrigerating chamber is composed of plural sections.

8. The method as claimed in claim 1, wherein if the refrigerator is carrying out a F cycle operation, and the refrigerating chamber temperature rises to exceed an upper limit of a preset temperature range, further comprising a multiple stage load responding step for operating the refrigerating chamber evaporator fan only if the refrigerating chamber temperature exceeds an upper limit of a first preset temperature range or for switching to carrying out the RF cycle operation if the refrigerating chamber temperature exceeds an upper limit of a second preset temperature range.

9. The method as claimed in claim 1, wherein if refrigerator is carrying out an F cycle operation, and the refrigerating chamber temperature rises to exceed an upper limit of a first or second preset temperature range, further comprising:

a first load responding step for operating the refrigerating chamber evaporator fan provided at the refrigerating chamber evaporator when the refrigerating chamber temperature exceeds an upper limit of a first preset temperature range; and
   a second load responding step for causing the refrigerator to switch to carrying out an RF cycle operation when the refrigerating chamber temperature exceeds an upper limit of a second preset temperature range higher than that of the first preset temperature range.

10. The method as claimed in claim 9, wherein the first load responding step comprises:

a step for operating the refrigerating chamber evaporator fan from a moment when the refrigerating chamber temperature exceeds an upper limit of the first preset temperature range to a moment when the refrigerating chamber temperature reaches to an upper limit of the second preset temperature range, and
   a step for stopping the refrigerating chamber evaporator fan when the refrigerating chamber temperature falls to within the first preset temperature range.

11. The method as claimed in claim 9, wherein the second load responding step comprises:
   a step for operating the RF cycle together with the refrigerating chamber evaporator fan when the refrigerating chamber temperature exceeds an upper limit of the second preset temperature range, and
   a step for stopping operation of the RF cycle and the refrigerating chamber evaporator fan when the refrigerating chamber temperature falls to within a first preset temperature range.

12. The method as claimed in claim 9, wherein the upper limit of the second preset temperature range is higher than that of the first preset temperature range, and a lower limit of the second preset temperature range is equal to that of the first preset temperature range.

13. A method for controlling a refrigerator, in which at least one refrigerating chamber and a freezing chamber are cooled by a refrigerating-freezing (RF) cycle which operates a refrigerating chamber evaporator and a freezing chamber evaporator, or by a freezing (F) cycle which operates only the freezing chamber evaporator, comprising:
   (a) starting a compressor;
   (b) conducting at least one cycle selected from the group consisting of an RF cycle and an F cycle based on a temperature of the freezing chamber or a temperature of the at least one refrigerating chamber;
   (c) stopping the compressor if a temperature of the freezing chamber is within a preset freezing temperature range and a temperature of the at least one refrigerating chamber is within a preset refrigerating temperature range; and
   (d) repeating steps (a)–(c).

14. The method of claim 13, wherein starting the compressor comprises starting the compressor when a temperature of the freezing chamber exceeds an upper limit of the preset freezing temperature range.

15. The method of claim 14, further comprising sustaining operation of the compressor if the temperature of the freezing chamber falls within the preset freezing temperature range and a temperature of the at least one refrigerating chamber exceeds an upper limit of the preset refrigerating temperature range.

16. The method of claim 13, wherein conducting at least one cycle comprises:
   initiating the RF cycle if a temperature of the freezing chamber exceeds an upper limit of the preset freezing temperature range and a temperature of the at least one refrigerating chamber exceeds an upper limit of the preset refrigerating temperature range;
   initiating the F cycle if a temperature of the at least one refrigerating chamber is within the preset refrigerating temperature range and a temperature of the freezing chamber exceeds the upper limit of the preset freezing temperature range; and
   initiating the RF cycle if a temperature of the freezing chamber is within the preset freezing temperature range and a temperature of the at least one refrigerating chamber exceeds the upper limit of the preset refrigerating temperature range.

17. The method of claim 16, wherein the step of initiating the RF cycle if a temperature of the freezing chamber is within the preset freezing temperature range and a temperature of the at least one refrigerating chamber exceeds the upper limit of the preset refrigerating temperature range further comprises suppressing a heat exchange operation of a freezing chamber evaporator by stopping a freezing chamber evaporator fan.

18. The method of claim 13, wherein conducting at least one cycle comprises:
   initiating the RF cycle if a temperature of the freezing chamber exceeds an upper limit of the preset freezing temperature range and a temperature of the at least one refrigerating chamber exceeds an upper limit of the preset refrigerating temperature range;
   initiating the F cycle if a temperature of the at least one refrigerating chamber is within the preset refrigerating temperature range and a temperature of the freezing chamber exceeds the upper limit of the preset freezing temperature range; and
   thereafter sustaining the F cycle if the refrigerating chamber temperature exceeds the upper limit of the preset refrigerating temperature range, even if the freezing chamber temperature falls to within the preset freezing temperature range.

19. The method of claim 18, wherein sustaining the F cycle further comprises operating a refrigerating chamber evaporator fan while sustaining the F cycle.

20. The method of claim 13, wherein the at least one refrigerating chamber comprises a first refrigerating chamber and a second refrigerating chamber, and wherein stopping the compressor further comprises stopping the compressor when a temperature of the freezing chamber is within the preset freezing temperature range, and a temperature of at least one of the first refrigerating chamber and the second refrigerating chamber is within a preset refrigerating temperature range.

21. The method of claim 13, further comprising:
   operating a refrigerating chamber evaporating fan without operating the compressor when a temperature of the at least one refrigerating chamber exceeds an upper limit of a first preset refrigerating temperature; and
   conducting the RF cycle when a temperature of the at least one refrigerating chamber exceeds an upper limit of a second preset refrigerating temperature range.

22. The method of claim 21, wherein the upper limit of the second preset refrigerating temperature range is higher than the upper limit of the first preset refrigerating temperature range.

23. The method of claim 22, wherein a lower limit of the second preset refrigerating temperature range is substantially equal to a lower limit of the first preset refrigerating temperature range.

* * * * *